US011232227B1

(12) United States Patent
Chin et al.

(10) Patent No.: US 11,232,227 B1
(45) Date of Patent: Jan. 25, 2022

(54) DATA LEAK PREVENTION USING CONTENT BASED SEGMENTATION SCANNING

(71) Applicant: Riverbed Technology, Inc., San Francisco, CA (US)

(72) Inventors: Bill Y. Chin, Sunnyvale, CA (US); Arthur L. Jones, Larkspur, CA (US); Kand Ly, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 357 days.

(21) Appl. No.: 16/203,449

(22) Filed: Nov. 28, 2018

Related U.S. Application Data

(60) Provisional application No. 62/592,296, filed on Nov. 29, 2017.

(51) Int. Cl.
*H04L 29/06* (2006.01)
*G06F 21/62* (2013.01)
*H04L 12/26* (2006.01)
*G06F 21/60* (2013.01)
*G06F 16/174* (2019.01)

(52) U.S. Cl.
CPC ...... *G06F 21/6245* (2013.01); *G06F 16/1748* (2019.01); *G06F 21/602* (2013.01); *H04L 43/16* (2013.01); *H04L 63/0421* (2013.01); *H04L 63/0428* (2013.01)

(58) Field of Classification Search
CPC ............... G06F 21/6245; G06F 21/602; G06F 16/1748; H04L 63/0421; H04L 63/0428; H04L 43/16
See application file for complete search history.

(56) References Cited

U.S. PATENT DOCUMENTS

| 8,127,365 B1* | 2/2012 | Liu | H04L 63/105 |
| | | | 726/26 |
| 9,116,848 B1* | 8/2015 | Jordan | G06F 11/1453 |
| 9,191,201 B1* | 11/2015 | Thangavelu | H04L 9/0822 |
| 9,336,143 B1* | 5/2016 | Wallace | G06F 3/0641 |

(Continued)

OTHER PUBLICATIONS

Kyrre W. Kongsgård et al., An Internal/Insider Threat Score for Data Loss Prevention and Detection, Mar. 2017, ACM, pp. 11-16. (Year: 2017).*

(Continued)

*Primary Examiner* — Luu T Pham
*Assistant Examiner* — Fahimeh Mohammadi
(74) *Attorney, Agent, or Firm* — Park, Vaughan, Fleming & Dowler LLP

(57) ABSTRACT

Systems and techniques are described for preventing data leaks from a network. A set of sensitive files or sensitive data that includes sensitive information can be received, and a first set of labels can be determined based on the set of sensitive files or sensitive data. An apparatus can then receive data that is to be checked for sensitive information, and determine a second set of labels based on the data. Next, the apparatus can match the second set of labels with the first set of labels. The apparatus can then determine whether or not the data includes sensitive information based on a result of said matching, and perform a data leak prevention action if it is determined that the data includes sensitive information.

9 Claims, 3 Drawing Sheets

(56) References Cited

U.S. PATENT DOCUMENTS

| | | | |
|---|---|---|---|
| 2006/0059567 A1* | 3/2006 | Bird | G06F 21/6227 726/27 |
| 2010/0083346 A1* | 4/2010 | Forman | G06F 21/577 726/1 |
| 2012/0137375 A1* | 5/2012 | Ramachandran | G06F 21/6218 726/28 |
| 2013/0283041 A1* | 10/2013 | Vajirkar | H04L 61/1511 713/156 |
| 2013/0311432 A1* | 11/2013 | Aslot | G06F 16/1752 707/692 |
| 2014/0068777 A1* | 3/2014 | Piratla | G06F 21/60 726/26 |
| 2014/0304197 A1* | 10/2014 | Jaiswal | G06F 21/6209 706/12 |
| 2014/0324476 A1* | 10/2014 | Dufel | G16H 10/60 705/3 |
| 2015/0033221 A1* | 1/2015 | Chari | G06F 21/53 718/1 |
| 2017/0185799 A1* | 6/2017 | Zheng | G06F 16/9535 |
| 2017/0289624 A1* | 10/2017 | Avila | H04L 65/604 |
| 2019/0021078 A1* | 1/2019 | Otwani | H04L 1/1812 |

OTHER PUBLICATIONS

Dan Du et al., Semantic Similarity Detection For Data Leak Prevention, Apr. 2015, ACM, pp. 1-6. (Year: 2015).*

Miodrag Petkovic et al., A host based method for data leak protection by tracking sensitive data flow, Apr. 11-13, 2012, IEEE, pp. 267-274. (Year: 2012).*

Jingwei Li et al., Information Leakage in Encrypted Deduplication via Frequency Analysis, Jun. 26-29, 2017, IEEE, pp. 1-12. (Year: 2017).*

* cited by examiner

DATA LEAK PREVENTION USING CONTENT BASED SEGMENTATION SCANNING

RELATED APPLICATION

This application claims benefit of U.S. Provisional Patent Application No. 62/592,296, entitled "FAST AND DISTRIBUTED DATA LEAK PREVENTION USING CONTENT-BASED SEGMENTATION SCANNING," by the same inventors, filed on 29 Nov. 2017, the contents of which are herein incorporated by reference in their entirety for all purposes.

BACKGROUND

The present disclosure generally relates to data leak prevention. More specifically, the present disclosure relates to fast and distributed data leak prevention using content-based segmentation scanning.

Data leakage is a big problem for companies. With the amount of data transferred in and out of an enterprise network, it is a challenge to scan all the data on-the-fly and immediately block data that should not be shared with external entities. It is also a challenge to detect leakage when data is being sent in separate chunks or the protected data has been modified.

Existing solution for data leak prevention either scan for a limited set of patterns to prevent leakage of specific data like social security numbers and credit card numbers, or make a copy of what data was transferred to do an offline analysis later. The first solution doesn't prevent leakage of sensitive files that contain non-specific data. The second solution doesn't prevent a data leakage on the spot but just recognizes it later.

Therefore, what are needed are techniques and systems for data leak prevention without the above-described drawbacks.

SUMMARY

This disclosure provides techniques and systems for preventing data leaks from a network. Some embodiments can receive a set of sensitive files or sensitive data that includes sensitive information. Next, the embodiments can determine a first set of labels based on the set of sensitive files or sensitive data, wherein each label in the first set of labels corresponds to a data segment in the set of sensitive files or sensitive data. The embodiments can then receive data that is to be checked for sensitive information (e.g., before it is forwarded to another apparatus). Next, the embodiments can determine a second set of labels based on the data. The embodiments can then match the second set of labels with the first set of labels. Next, the embodiments can determine whether or not the data includes sensitive information based on a result of said matching. Specifically, in some embodiments, a count of matching labels can be compared with a threshold, and the result of said comparison can be used to determine whether or not the data includes sensitive information (e.g., sensitive information is detected when the count is greater than the threshold). Finally, the embodiments can perform a data leak prevention action if the data is determined to include sensitive information. For example, the data leak prevention action can include, but is not limited to, blocking the data and/or alerting a network administrator.

In some embodiments, data leak prevention can be performed by a wide area network (WAN) optimization device, wherein the WAN optimization device de-duplicates and forwards the data to another apparatus if the data does not include sensitive information.

In some embodiments, data leak prevention is performed on an apparatus that is a gateway device in the network, i.e., all network traffic exiting the network passes through the apparatus.

In some embodiments, data leak prevention is performed on an endpoint device, e.g., a smartphone, a tablet computer, a personal computer, etc. In these embodiments, the data leak can be detected at the source or at the destination, e.g., at a compromised personal computer that is either the sender or the receiver of the data leak.

In some embodiments, if the data received at the apparatus is encrypted, then the apparatus decrypts the encrypted data before determining the second set of labels.

DETAILED DESCRIPTION

Figure 1:
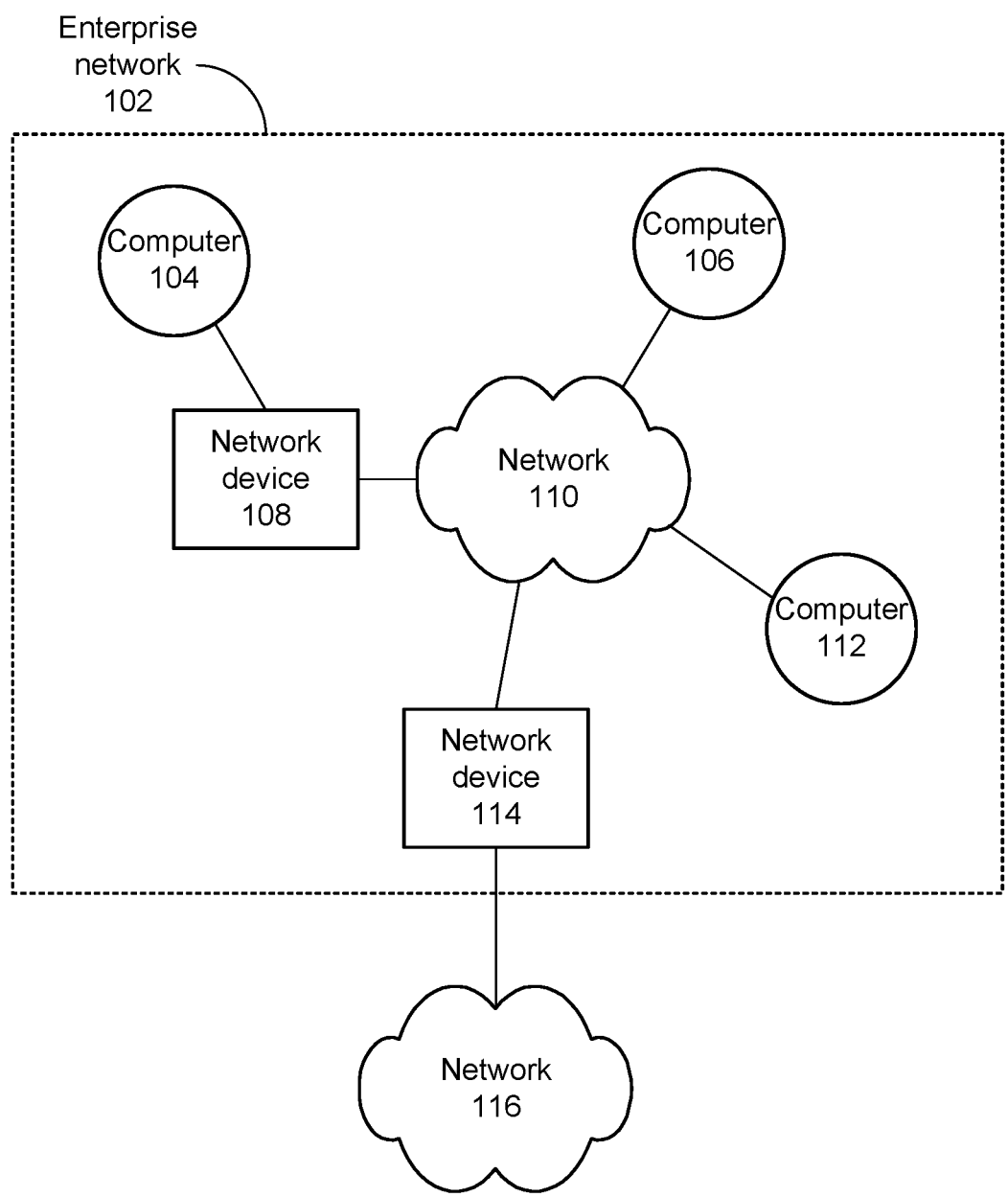
FIG. 1 illustrates a network in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

According to one definition, a computer is any device that is capable of performing computations. In some embodiments, a computer can include a processing mechanism that is capable of executing instructions stored on a storage medium. Examples of computers include, but are not limited to, handheld computers, laptop computers, desktop computers, distributed computers, printers, appliances, etc. According to one definition, a data communication network (or "network" for short) is an interconnection of one or more devices that is capable of delivering information from one computer to another computer. Examples of networks include, but are not limited to, wireless and wired networks, local area networks (LANs), metropolitan area networks (MANs), WANs, private networks, public networks, intranets, internets, etc. Data communication networks often include a variety of network devices for sending, receiving, directing, and optimizing network data traffic.

Enterprise networks can include one or more WANs that interconnect offices that can be distributed over a large geographical area. Improving performance of the enterprise network is important because it improves productivity, which in turn increases profitability of the organization. Some enterprise networks use WAN optimization devices to improve network performance. WAN optimization devices optimize network traffic to improve WAN performance in reading and/or writing data over a network. WAN optimization devices typically compress data (e.g., by performing de-duplication) and perform other optimization tasks (e.g., caching, prefetching, etc.) to improve WAN performance.

WAN optimization devices may operate singly or in pairs at each side of a WAN connection to optimize network traffic. WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers.

Techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. In this disclosure, the term "WAN optimization device" is used to refer to such devices and applications and "WAN optimization" is used to refer to such techniques.

This disclosure provides a data leak solution that uses scalable data representation (SDR) technology to recognize, on-the-fly, the transfer of data that are flagged as sensitive. In SDR, data is broken up into small segments, and then labels are assigned to each segment. Since SDR tends to assign the same labels to the same data patterns, an apparatus or a network device (e.g., a computer, a WAN optimization device, etc.) can use the SDR-based file map representation to "de-duplicate" the data. To this end, the apparatus can maintain a repository of segments, called the segment store. The segment store contains mappings from SDR labels to segment data thereby allowing the translation of a sequence of labels comprising a data map to the underlying data represented by that data map. Since each segment tends to be stored just once, redundancies in file data can be eliminated.

Whenever a new label is created to represent SDR data, it is given a globally unique name. Thus, by design, SDR labels are globally unique and data can be referred to simply using its SDR label. A key property of the overall system is that the label-to-data mapping is reliably maintained somewhere in the system for the duration that the label is in use. Additional details of SDR technology, of how data can be segmented, of how labels can be created and maintained for the segments, and of how the segment store can be used for de-duplication can be found in (1) U.S. Pat. No. 8,508,389, entitled "Content-based segmentation scheme for data compression in storage and transmission including hierarchical segment representation," by inventors Steven McCanne and Michael Demmer, the contents of which are herein incorporated by reference in their entirety for all purposes, and (2) U.S. Pat. No. 7,120,666, entitled "Transaction accelerator for client-server communication systems," by inventors Steven McCanne and Michael Demmer, the contents of which are herein incorporated by reference in their entirety for all purposes.

In some embodiments, the segment store is enhanced to indicate whether the segment includes sensitive data or not. Specifically, the sensitive files or data would be flagged by the user and our system would use SDR to create and maintain a segment datastore to match. Next, the system would then scan any data transfer and recognize that it is sensitive data because the SDR algorithm would match the transferred data with the datastore data. The system could even recognize sensitive data that has been partially modified or that has insertion and/or deletion of part of it as well as data sent in chunks. In such situations, the SDR data would not match 100% but we can set a certain matching threshold above which to consider it likely to be the same original data.

The data scanning can be done either locally to where the original data is or remotely at every exit point of the network so that the sensitive data can be transferred internally but not externally. In this embodiment, we can copy the SDR data ahead of time to the remote locations for better accuracy or just the SDR labels to lower the amount of data to be sent remotely. The SDR labels should be enough to match data transferred to original data.

For the case where encrypted protocols are used for data transfer, we could have our system scan the data between the place it is read from storage and the place it is encrypted or we could have a proxy solution that decrypts the data transfer before it could get to a remote network. The system could then either block the data transfer as soon as it matches something or alert the administrator.

The advantage of this solution compared to existing solutions is that we can, on-the-fly, match for a complete set of files and not just some predefined patterns (e.g., social security numbers and credit card numbers) and we can immediately block unauthorized data transfers. The SDR technology may also be used for WAN optimization, so it can be combined with WAN optimization to distribute the information about sensitive data and scanning for leakage can be done with little to no extra overhead when the data transfers are also optimized.

FIG. 1 illustrates a network in accordance with some embodiments described herein. Enterprise network 102 can include computers 104, 106, and 112, network devices 108 and 114, and network 110 (e.g., a LAN or a secure private network). Some embodiments can implement data leak prevention at the data source (e.g., at an endpoint device) and/or near the data source and/or at the network device where the network traffic exits the enterprise network. For example, in some embodiments, data leak prevention can be implemented, e.g., as a software module, at computers 104, 106, and/or 112, thereby preventing any sensitive information from leaking out of the computers themselves. In some embodiments, data leak prevention can be implemented at network device 108, thereby preventing any sensitive information from leaking past network device 108. In some embodiments, data leak prevention can be implemented at network device 114, thereby preventing any sensitive information from leaking out of enterprise network 102. Different levels of data leak prevention can be implemented at different locations within enterprise network 102. For example, network device 108 can implement data leak prevention for only highly sensitive data on computer 104, which is not allowed to be shared with other computers in the enterprise network, and network device 114 can implement data leak prevention for sensitive data that is allowed to be shared within enterprise network 102, but that is not allowed to be shared outside enterprise network 102.

Figure 2:
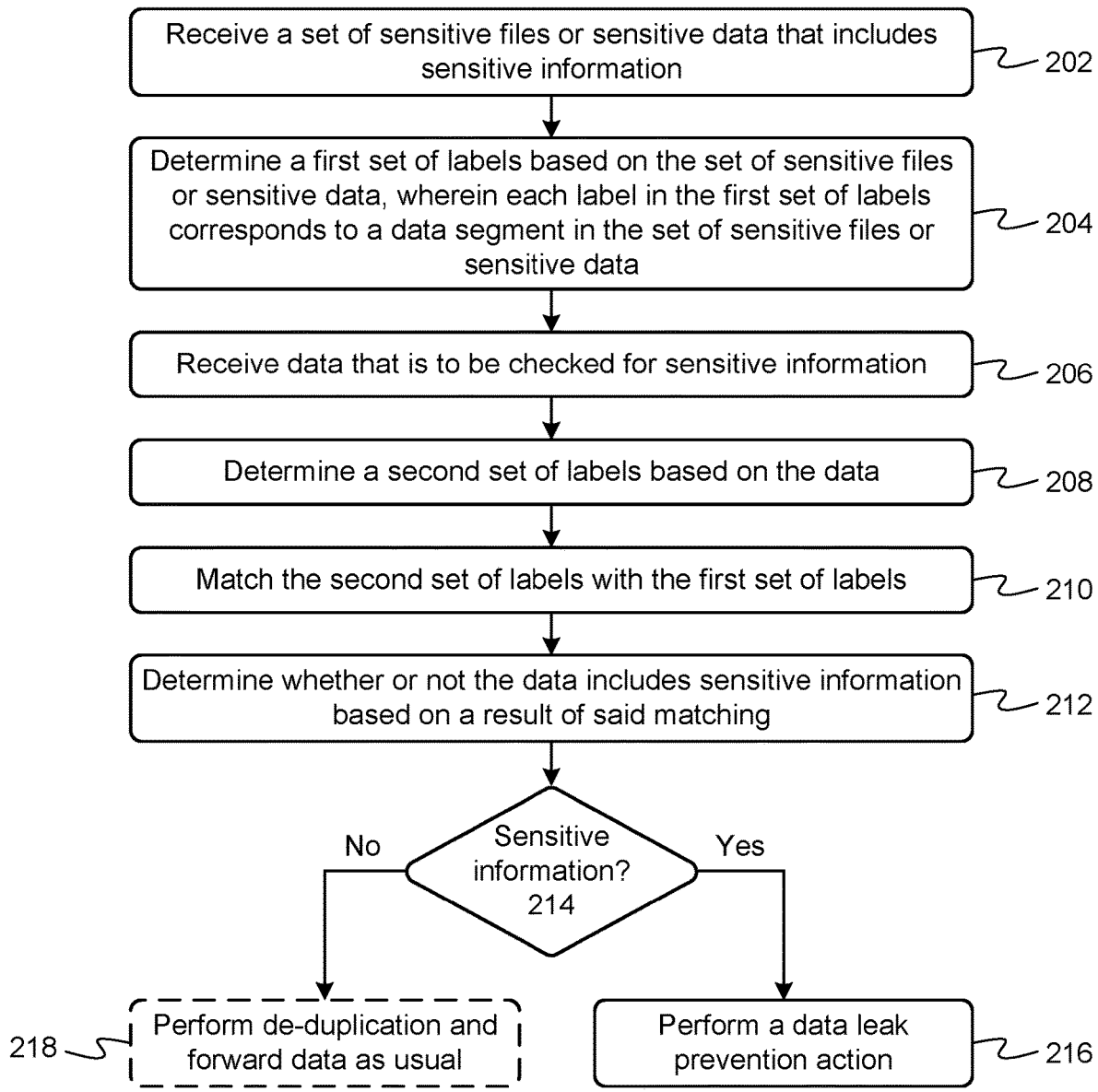
FIG. 2 illustrates a process for preventing data leaks from a network in accordance with some embodiments described herein.

FIG. 2 illustrates a process for preventing data leaks from a network in accordance with some embodiments described herein. The process can begin by receiving a set of sensitive files or sensitive data that includes sensitive information (step 202). Next, the process can determine a first set of labels based on the set of sensitive files or sensitive data, wherein each label in the first set of labels corresponds to a data segment in the set of sensitive files or sensitive data (step 204). The process can then receive data that is to be checked for sensitive information (step 206). For example, on a WAN optimization device, the received data may be data that is to be sent to another network device. As another example, on an endpoint device, the received data may be data that was received from another computer. Next, the process can determine a second set of labels based on the data (step 208). The process can then match the second set of labels with the first set of labels (step 210). Next, the process can determine whether or not the data includes sensitive information based on a result of said matching (step 212). If sensitive information is detected ("Yes" branch of step 214), then the process can perform a data leak prevention action (step 216). On the other hand, if sensitive information is not detected ("No" branch of step 214), then the process can perform de-duplication and forward the data as usual (step 218)—this step is optional, and is accordingly shown with a dashed line in FIG. 2.

Figure 3A:
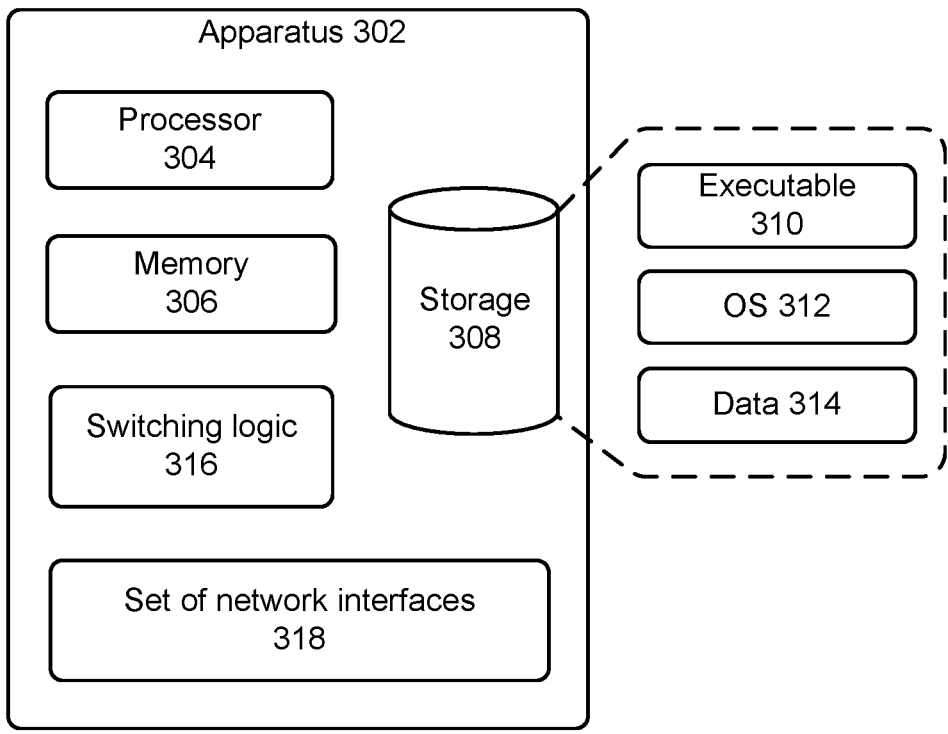
FIG. 3A illustrates an apparatus in accordance with some embodiments described herein.

FIG. 3A illustrates an apparatus in accordance with some embodiments described herein. Apparatus 302 (e.g., a smartphone, a tablet computer, a computer, a WAN optimization device, etc.) comprises processor 304, memory 306 (e.g., a volatile or non-volatile random access memory), and storage 308 (e.g., a flash memory device or a disk drive). Storage 308 can store executable 310, operating system 312, and data 314. The components in apparatus 302 can communicate with one another using a communication mechanism, e.g., a bus, a backplane, and/or a switching fabric. Executable 310 can include instructions that, when executed by processor 304, cause apparatus 302 to perform one or more methods that are implicitly or explicitly described in this disclosure. Data 314 can include any data that is inputted into or outputted by executable 310.

Apparatus 302 can also include switching logic 316 and set of network interfaces 318. Set of network interfaces 318 can be used to transmit data to and/or receive data from other communication devices. Switching logic 316 can forward network traffic received on one or more network interfaces in accordance with switching/forwarding/routing information stored in apparatus 302. Specifically, switching logic 316 can be configured by processor 304 in accordance with one or more methods that are implicitly or explicitly described in this disclosure.

Figure 3B:
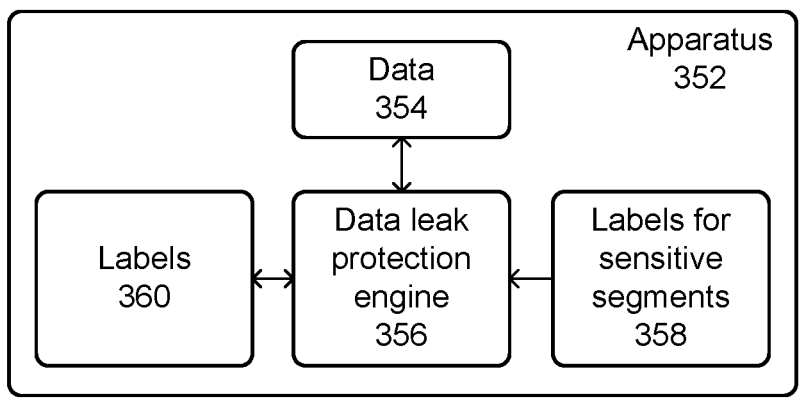
FIG. 3B illustrates a logical view of an apparatus in accordance with some embodiments described herein.

FIG. 3B illustrates a logical view of an apparatus in accordance with some embodiments described herein. Apparatus 352 can include data 354 that is to be checked for sensitive information (e.g., before the data is forwarded to another apparatus), data leak protection engine 356 which determines whether or not data 354 contains sensitive information, labels for sensitive segments 358 that are pre-computed based on sensitive files and data that were provided by a user, and labels 360 that are determined based on data 354. Data leak prevention engine 356 can be an executing process itself, or it can be a module that is invoked by an executing process at runtime, or it can be logic that is implemented in an integrated circuit (IC). Labels for sensitive segments 358 can be stored on a storage medium, e.g., storage 308 in FIG. 3A. In some embodiments, data leak prevention engine 356 can compute labels 360 based on data 354, and compare labels 360 with labels of sensitive segments 358. Based on the comparison, data leak prevention engine 356 can decide what action, if any, needs to be performed on data 354. Specifically, data leak prevention engine 356 can block data 354 from being forwarded and/or alert a network administrator if the comparison indicates that data 354 contains sensitive information.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for preventing data leaks from a network, the method comprising:
   receiving a set of sensitive files or sensitive data that includes sensitive information;
   determining a first set of labels based on the set of sensitive files or sensitive data, wherein each label in the first set of labels corresponds to a data segment in the set of sensitive files or sensitive data;
   receiving, at an apparatus, data that is to be checked for sensitive information;
   determining, at the apparatus, a second set of labels based on the data, wherein the second set of labels is used to de-duplicate the data;
   matching, at the apparatus, the second set of labels with the first set of labels;
   determining, at the apparatus, whether or not the data includes sensitive information based on comparing a count of matching labels with a threshold;
   performing, at the apparatus, a data leak prevention action if the data includes sensitive information, wherein the data leak prevention action comprises blocking the data and/or altering a network administrator; and performing, de-duplication and forwarding the data to another apparatus if the data does not include sensitive information.

2. The method of claim 1, wherein all network traffic exiting the network passes through the apparatus.

3. The method of claim 1, wherein the data received at the apparatus is encrypted, and wherein determining, at the apparatus, the second set of labels based on the data comprises decrypting the data before determining the second set of labels.

4. A non-transitory computer-readable storage medium storing instructions that, when executed by a processor in an apparatus, cause the apparatus to perform a method for preventing data leaks from a network, the method comprising:

receiving a first set of labels that were computed based on a set of sensitive files or sensitive data that includes sensitive information, wherein each label in the first set of labels corresponds to a data segment in the set of sensitive files or sensitive data;

receiving data that is to be checked for sensitive information;

determining a second set of labels based on the data, wherein the second set of labels is used to de-duplicate the data;

matching the second set of labels with the first set of labels;

determining whether or not the data includes sensitive information based on comparing a count of matching labels with a threshold;

performing a data leak prevention action if the data includes sensitive information, wherein the data leak prevention action comprises blocking the data and/or altering a network administrator; and performing, de-duplication and forwarding the data to another apparatus if the data does not include sensitive information.

5. The non-transitory computer-readable storage medium of claim 4, wherein all network traffic exiting the network passes through the apparatus.

6. The non-transitory computer-readable storage medium of claim 4, wherein the data received at the apparatus is encrypted, and wherein determining the second set of labels based on the data comprises decrypting the data before determining the second set of labels.

7. An apparatus, comprising:

a processor; and a non-transitory computer-readable storage medium storing instructions that, when executed by the processor, cause the apparatus to perform a method for preventing data leaks from a network, the method comprising:

receiving a first set of labels that were computed based on a set of sensitive files or sensitive data that includes sensitive information, wherein each label in the first set of labels corresponds to a data segment in the set of sensitive files or sensitive data;

receiving data that is to be checked for sensitive information;

determining a second set of labels based on the data, wherein the second set of labels is used to de-duplicate the data;

matching the second set of labels with the first set of labels;

determining whether or not the data includes sensitive information based on comparing a count of matching labels with a threshold;

performing a data leak prevention action if the data includes sensitive information, wherein the data leak prevention action comprises blocking the data and/or altering a network administrator; and performing de-duplication and forwarding the data to another apparatus if the data does not include sensitive information.

8. The apparatus of claim 7, wherein all network traffic exiting the network passes through the apparatus.

9. The apparatus of claim 7, wherein the data received at the apparatus is encrypted, and wherein determining the second set of labels based on the data comprises decrypting the data before determining the second set of labels.

* * * * *